Dec. 29, 1942.　　　R. B. COTTRELL　　　2,306,397
CUSHIONING MEANS
Filed May 31, 1940　　　4 Sheets-Sheet 1
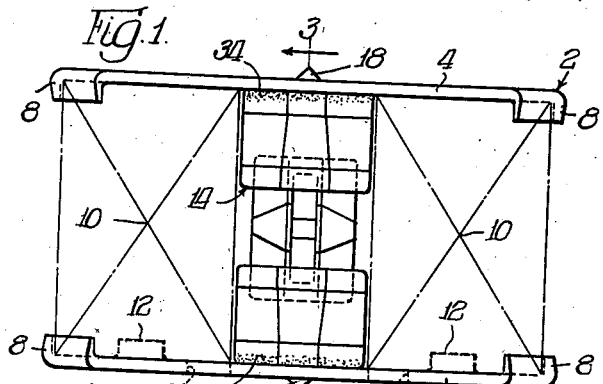
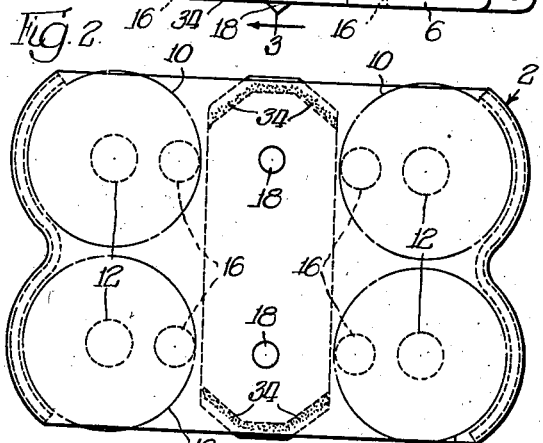
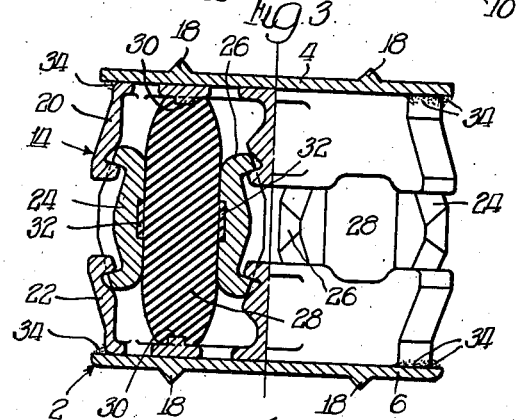
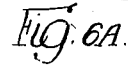
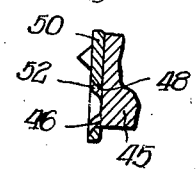
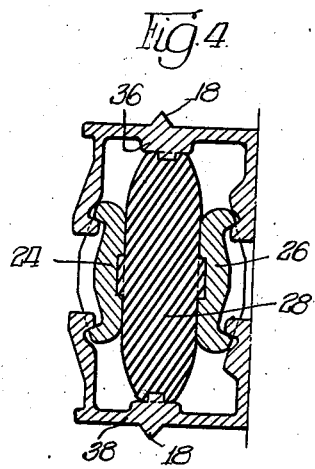
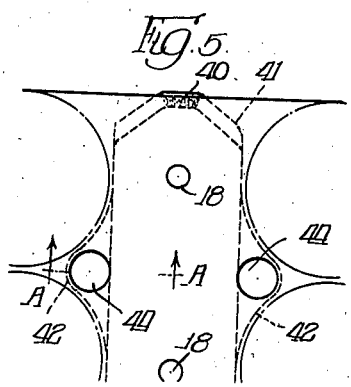
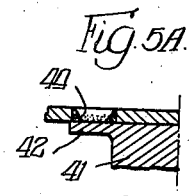
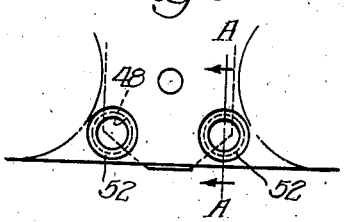
INVENTOR.
Robert B. Cottrell,
BY
att'y.

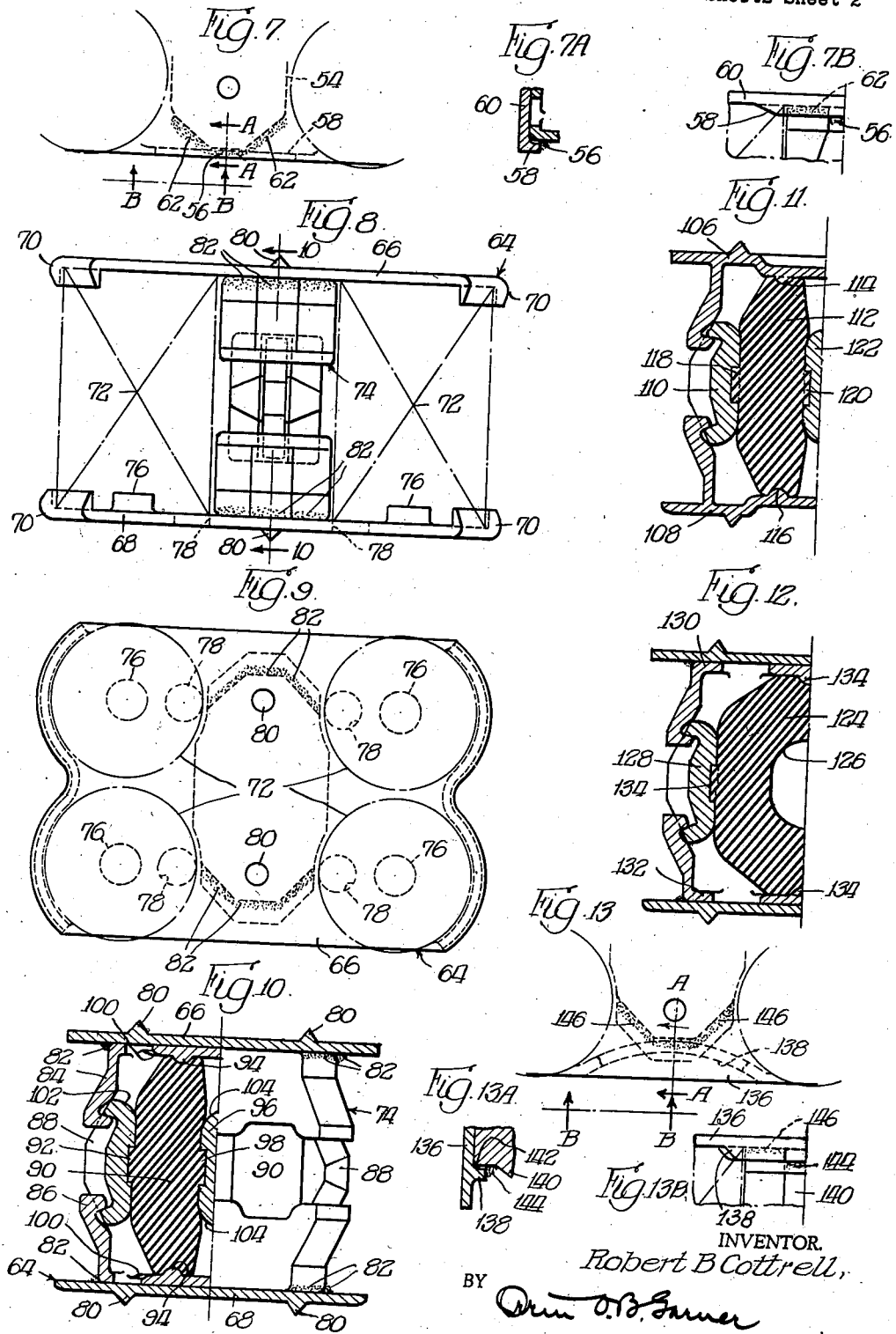

Dec. 29, 1942.  R. B. COTTRELL  2,306,397
CUSHIONING MEANS
Filed May 31, 1940  4 Sheets-Sheet 3
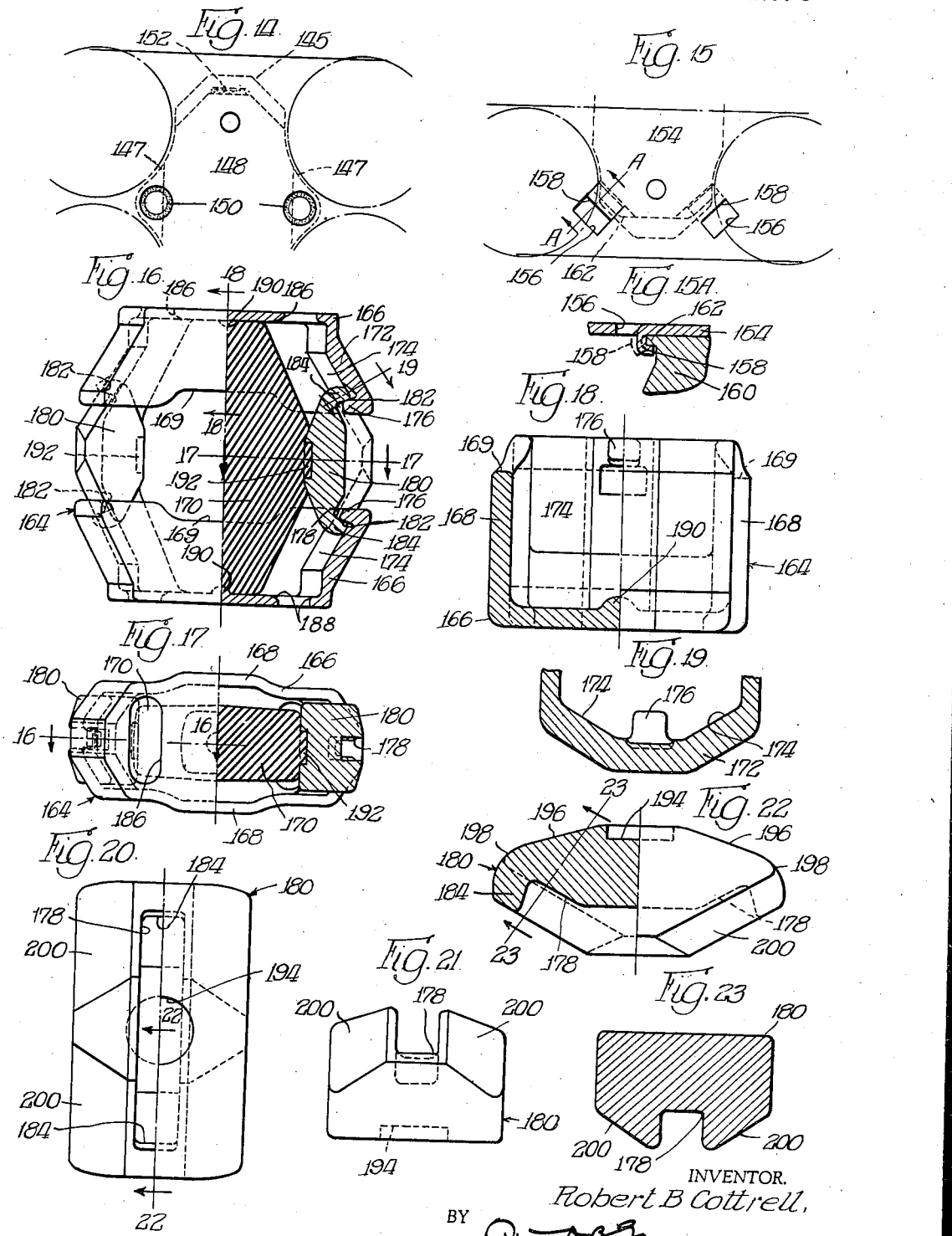
INVENTOR.
Robert B Cottrell,
BY
Orin O. B. Farmer
attorney Dec. 29, 1942.   R. B. COTTRELL   2,306,397
CUSHIONING MEANS
Filed May 31, 1940   4 Sheets-Sheet 4
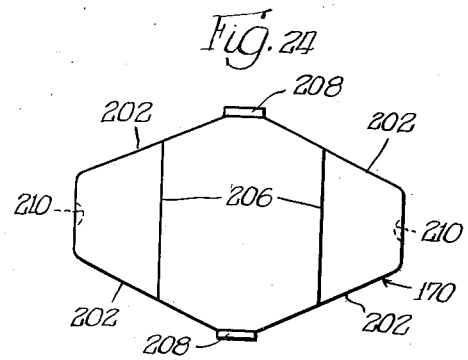
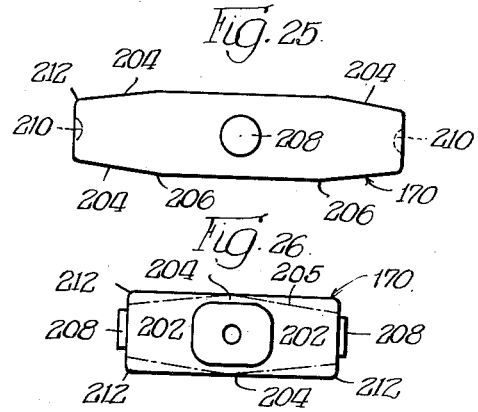
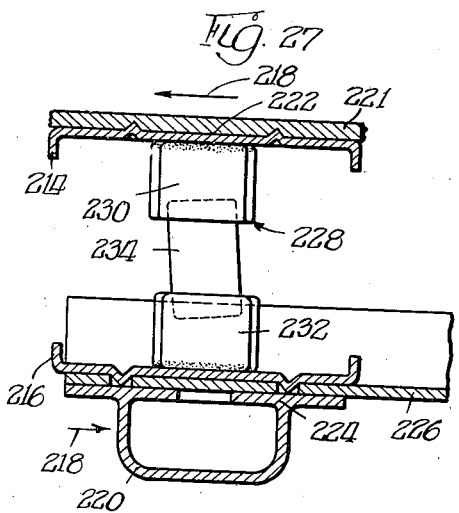
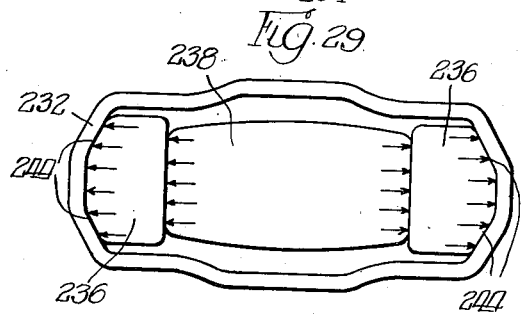
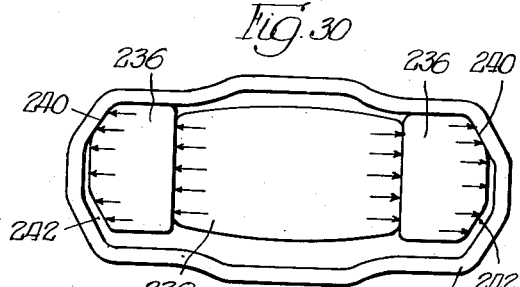
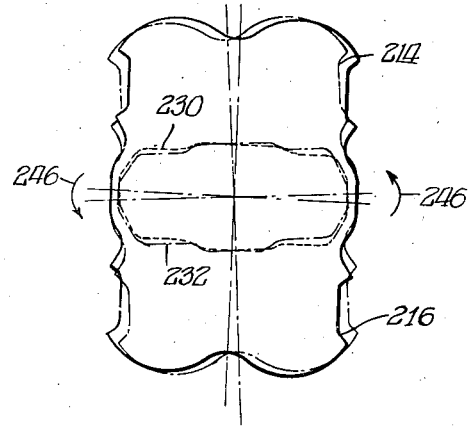
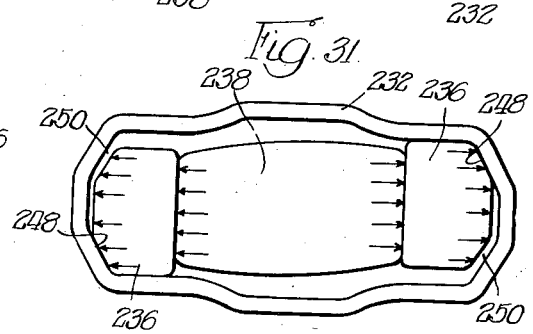
INVENTOR.
Robert B. Cottrell,
BY
Atty Patented Dec. 29, 1942

2,306,397

UNITED STATES PATENT OFFICE 2,306,397

CUSHIONING MEANS

Robert B. Cottrell, Chicago, Ill., assignor to American Steel Foundries, Chicago, Ill., a corporation of New Jersey Application May 31, 1940, Serial No. 338,028

32 Claims. (Cl. 267—9)

My invention relates to a cushioning arrangement for a railway car truck and more particularly to a combination of free acting springs such as coil springs with a friction absorbing device.

In combination cushioning devices comprising coil springs and a friction absorbing device such as a snubber or an elliptic spring, the common practice has been to seat the top and bottom of the friction absorbing member against the top and bottom plates confining the cushioning mechanism in such manner that relative lateral or torsional movement between the supporting and supported members of the car truck would not affect the operation of the friction absorbing member. The common practice has been so to arrange the snubbing device between the top and bottom plate as to prevent relative movement between the followers thereof due to such slight movements as those above mentioned. These movements are commonly accommodated in the snubber structure by affording arcuate seats at the top and bottom of the snubbing device. In coil springs these movements may be accommodated by lateral displacement of the springs or by the normal bending permitted by this spring.

An object of my invention is to design a cushioning device comprising resilient means such as coil springs in combination with friction absorbing means wherein the friction absorbing means is so related to the resilient means as to accomplish certain specific purposes, one of said purposes being to afford such a relationship between the parts of the cushioning device as to offer maximum resistance to torsional or other relative displacement between the top and bottom plates confining the cushioning device.

Another object of my invention is to design a novel cushioning arrangement of coil spring and snubbing device wherein the frictional elements of the snubbing device will be disposed adjacent the periphery of the cushioning mechanism in order to afford a maximum moment arm for the forces offering resistance to relative movement between the top and bottom plates forming a part of the cushioning mechanism.

My novel device comprises means for resisting relative lateral and torsional movement between the followers of a friction absorbing device and comprehends an arrangement wherein side wedges fit into V-shaped frictional surfaces of the followers and are held against them by precompression of a resilient block under confinement therebetween. Any relative lateral or torsional movement, particularly torsional, will cause the side wedges to be displaced from their V-shaped seat, further compressing the resilient block.

A more specific object of my invention is to design a novel form of friction absorbing device particularly suitable for the accomplishment of the purposes herein set forth wherein certain of the friction absorbing surfaces are spaced a maximum distance from the center of rotation about which relative movement of the top and bottom followers is afforded.

In my novel arrangement coil springs and a friction absorbing means are confined between top and bottom plates of a cushioning mechanism and the top and bottom followers of the friction means are secured respectively to the top and bottom plates of the cushioning mechanism in such manner that relative movement between the supporting and supported truck members causes similar relative movement between the top and bottom followers of the friction means. Thus the friction means offers resistance to any such relative movement and tends to return the parts to their normal position.

In the drawings Figure 1 is a side elevation of a cushioning mechanism embodying my invention. Figure 2 is a top plan view thereof and Figure 3 is a sectional view taken substantially in the vertical plane indicated by the line 3—3 of Figure 1.

Figure 4 is a fragmentary section comparable to that of Figure 3 but showing the top and bottom spring plates made integral with the top and bottom followers of the friction device.

Figure 5 is a fragmentary top plan view corresponding generally to Figure 2 but showing an alternate method of securing a follower of the friction device to the spring plate. Figure 5A is a fragmentary sectional view through the structure shown in Figure 5, the section being taken in a vertical plane indicated by the line A—A of Figure 5.

Figure 6 is a fragmentary top plan view corresponding to the view of Figure 2 but showing another alternate method of securing the friction device follower to the spring plate. Figure 6A is a fragmentary sectional view through the structure shown in Figure 6, the section being taken in the vertical plane indicated by the line A—A of Figure 6.

Figure 7 is a fragmentary top plan view of a still further modification corresponding in general to the view shown in Figure 2, showing still another arrangement for securing a friction device follower to the spring plate. Figure 7A is a fragmentary sectional view through the structure shown in Figure 7, the section being taken substantially in the vertical plane indicated by the line A—A of Figure 7, and Figure 7B is a fragmentary side elevation of the structure shown in Figure 7, the view being taken substantially in the plane indicated by the line B—B of Figure 7.

Figure 8 is a side elevation of another modification of my novel cushioning mechanism.

Figure 9 is a top plan view of the structure shown in Figure 8.

Figure 10 is a sectional view in a vertical plane bisecting the device substantially as indicated by the line 10—10 of Fig. 8.

Figure 11 is a sectional view corresponding to that of Figure 10 but showing friction device followers formed integrally with the top and bottom spring plates.

Figure 12 is a further fragmentary section corresponding to those shown in Figures 10 and 11 but showing a different arrangement of the friction device.

Figure 13 is a fragmentary top plan view corresponding in general to the view of Figure 9 but showing an alternate method of securing the friction device follower to the spring plate. Figure 13A is a fragmentary sectional view of the vertical plane substantially indicated by the line A—A of Figure 13. Figure 13B is a fragmentary elevation view of the structure shown in Figure 13, the view being taken substantially from the plane indicated by the line B—B of Figure 13.

Figure 14 is a further fragmentary top plan view corresponding in general to the view of Figure 9 and showing a further modified arrangement for securing the friction device follower to the spring plate.

Figure 15 is a further fragmentary top plan view corresponding in general to the view shown in Figure 9 and showing still another alternate method of securing the friction device follower to the spring plate. Figure 15A is a fragmentary sectional view taken substantially in the vertical plane indicated by the line A—A of Figure 15.

Figure 16 is a view in elevation of my novel form of snubber using a modified resilient member, the figure being half in section with the section taken substantially in the vertical plane bisecting the device and as indicated by the line 16—16 of Figure 17.

Figure 17 is a top plan view of the device shown in Figure 16, also half in section, the section being taken substantially in the horizontal plane bisecting the device and as indicated by the line 17—17 of Figure 16.

Figure 18 is an end view of the follower used in the device shown in Figures 16 and 17, partly in section, the section being taken substantially in the transverse plane bisecting the follower and as indicated by the line 18—18 of Figure 16.

Figure 19 is a fragmentary sectional view through the friction end of the follower, the section being taken in the diagonal plane substantially as indicated by the line 19—19 of Figure 16.

Figure 20 is a plan view of the side wedge used in my novel friction absorbing device, the left half of said figure showing the top plan view and the right half the bottom plan thereof.

Figure 21 is an end elevation of the side wedge; Figure 22 is an end view thereof, half in section, the section being taken substantially in the plane bisecting the device and as indicated by the line 22—22 of Figure 20.

Figure 23 is a diagonal sectional through the side wedge, taken substantially in the plane indicated by the line 23—23 of Figure 22.

Figures 24, 25 and 26 show the detail form of the block of resilient material used in the snubber shown in Figures 16 and 17, Figure 24 being a side elevation, Figure 25 an end view, and Figure 26 a top plan thereof.

Figure 27 is a fragmentary sectional view through the transverse center line of a car truck, showing my novel cushioning mechanism seated thereon and relation of the parts thereof under conditions of lateral motion.

Figure 28 is a more or less diagrammatic top plan view of an embodiment of my novel cushioning mechanism, showing the action in torsional movement.

Figures 29, 30 and 31 are diagrammatic sketches of my novel form of friction absorbing device showing the relative positions therein respectively when the parts are in normal relationship to one another, when they are distorted by relative lateral motion of the supporting and supported truck members, and when they are distorted by relative torsional movement of said members.

Describing in greater detail the structure shown and referring first to the modification shown in Figures 1 to 3, my novel cushioning device, generally designated 2, comprises a top spring plate 4, an identical bottom spring plate 6, each of said plates having at each end an internal flange 8 having the configuration best shown in the top plan view of Figure 2 comprising arcuate portions designed to closely encircle and so confine the coil springs diagrammatically shown at 10, 10. Additional positioning means for the coil springs may be afforded in the form of inwardly projecting lugs 12, 12 centrally arranged with respect to each coil spring group. Confined between the top and bottom spring plates and centrally positioned is my novel friction absorbing device generally designated 14. The bottom spring plate 6 is shown with a plurality of positioning openings 16, 16 serving to accommodate lugs normally formed on a supporting truck member to position said spring plate with respect to said truck member. Also on the top and bottom spring plates are formed lugs 18, 18 designed to cooperate with openings in the supporting and supported truck members to assist in positioning the top spring plate with respect to said members. Normally, said truck member may also be afforded other positioning means such as downwardly directed flanges or lugs closely cooperating with the edges of the top and bottom spring plates to prevent relative movement between each of said plates and the associated truck member. The friction absorbing device 14 comprises the top follower 20, the identical bottom follower 22, outer side wedges 24, 24 and inner side wedges 26, 26, all of said side wedges being of identical form. Confined between the top and bottom follower and between an outer and an inner side wedge at each side of the device is a block of resilient material 28, said block being positioned with respect to top and bottom followers as indicated at 30, 30 and with respect to the side wedges as indicated at 32, 32.

In the modification shown in Figures 1 to 3 the top and bottom followers of the friction device are welded as indicated at 34, 34 to the top and bottom spring plates respectively. The welding is afforded conveniently at the lower edges or adjacent the peripheries of the spring plates as may be noted.

Figure 4 is a fragmentary view corresponding to the view of Figure 3 but showing at the top of the cushioning mechanism a combination friction absorbing device follower and spring plate 36 and at the bottom of the cushioning mechanism a similar member designated 38; otherwire the structure of Figure 4 corresponds with that shown in Figure 3 and the functioning is in all respects similar.

Other convenient means of securing the friction device follower to the spring plate are shown in Figures 5, 6 and 7. In Figure 5 welding 40 is afforded at each extremity of each friction device follower 41 with the adjacent edge of the spring plate, and each friction device follower is afforded a lateral ear or flange 42 in overlapping relationship with an opening formed in the adjacent spring plate to accommodate the welding indicated at 44, 44.

A different securing means for the follower and spring cap is shown in Figure 6 wherein the follower 45 is afforded an upstanding hollow lug 46 cooperating with the opening 48 formed in the spring plate 50. The outer edge of the hollow lug 46 may be expanded to overlie the chamfered outer perimeter of the opening 48 as indicated at 52.

A still further securing arrangement for the follower and spring plate is shown in Figure 7 wherein the follower 54 is welded at its extremities as at 56 with the inturned flange 58 formed on the spring plate 60. Laterally of the weld at 56 the diagonal edges of the follower 54 may also be welded to the plate as indicated at 62, 62.

The structure shown in Figures 8, 9 and 10 differs from that previously described principally in the form of the friction absorbing device. The general arrangement of the cushioning unit as a whole is the same, said unit being generally designated 64 and comprising the top spring plate 66 and the bottom spring plate 68, said plates having at the opposite ends the inturned flanges 70, 70 acting as retaining means for the enclosed coil springs diagrammatically shown at 72, 72, said coil springs being symmetrically placed adjacent the corners of the unit and spaced apart centrally thereof to accommodate the friction absorbing device generally designated 74. The spring plates may be afforded positioning means 76, 76 centrally of each coil spring as may be desired, particularly where an inner coil is used and said plates may be perforated as at 78, 78 to accommodate positioning lugs formed on an associated truck member. Likewise said plates may be afforded projecting lugs 80, 80, also serving as positioning means.

In the arrangement shown in Figures 8, 9 and 10 the top and bottom spring plates are secured respectively to the top and bottom followers of the friction device 74 as by welding shown at 82, 82 at the extremities of the followers and along the diagonal portions adjacent thereto. The friction device 74 comprises top and bottom followers 84 and 86 of identical form and side wedges 88, 88, also identical. In abutment with each side wedge 88 is a resilient column 90 of rubber-like material, said column having positioning means as at 92 for the adjacent side wedge 88 and also having positioning means at its ends as at 94 for engagement with the respective followers. Interposed between the resilient columns 90, 90 at opposite ends of the device is an oval block 96 of rigid material and positioning means between said oval block and each column 90 is afforded as at 98, 98 in this device. As in all modifications shown, rounded corners and edges are afforded on all of the parts having abutment with the resilient member 90 in order that said member may flow there-along freely without obstruction or abrasion when the device is compressed. Such rounded surfaces are shown on the followers at 100, 100, on the side wedges at 102, 102 and on the central rigid block 104, 104.

Figure 11 shows a modification wherein the top and bottom followers of the friction device are integrally formed with the top and bottom spring plates, said top integral follower and plate member being designated 106 and said bottom integral follower and plate member designated 108. In this modification the side wedges 110, 110 are similar to those already described and the resilient column 112 is like that shown and described in Figures 8, 9 and 10; positioning means being afforded therefor against the members 106 and 108 as at 114 and 116 and against the side wedges as at 118 and as at 120 against the oval rigid central block 122.

The modification shown in Figure 12 differs from that shown in Figures 8, 9 and 10 only in the form of the resilient means afforded within the friction absorbing device. In this modification the resilient member 124 is a single block of material which may be formed with a hollow center as indicated at 126 and afforded abutment with the side wedges 128, and top and bottom followers 130 and 132 with positioning means for each area of abutment as indicated at 134. In a further modification the opening in the resilient member 124 may be filled with a block or casing of rigid material if added rigidity of the member 124 is desired when the device is in operation.

Figures 13, 14 and 15 show alternate methods of securing the follower of the friction device to the spring plate. In Figure 13 the plate 136 is afforded an integral arcuate inturned flange 138 adjacent which the friction device follower 140 may seat as at 142 and welding between said flange and follower may be afforded as at 144. Additional welding between said plate and follower may be afforded along the adjacent diagonal portions of the follower as at 146, 146. The securing arrangement shown in Figure 14 is similar to that shown and described in Figure 5 with the follower 145 being afforded outwardly projecting ears or flanges 147, 147 at opposite sides thereof and the plate 148 being afforded openings overlying said flanges to accommodate welding as at 150, 150 around the edges of said openings. Welding is also accommodated at the ends of the follower as at 152. Figure 15 shows a further method of securing the follower to the plate wherein the plate 154 is punched as at 156 to form a lug 158, said lug having before assembly with the follower the form indicated in distorted lines (Figure 15A). The follower 160 is afforded a flange 162 along the diagonal end portion thereof adjacent the lug 158 and after assembly the lug may be bent over the flange 162 as shown in full lines in Figure 15A.

A further modification of my novel friction absorbing device is shown in detail in Figures 16 to 26 inclusive, the parts thereof, except for the enclosed resilient member, being generally similar to corresponding parts of the friction device shown in Figure 12. This modification is shown in greater detail in order to illustrate accurately the detail of the snubber parts. The snubber or friction absorbing device generally designated 164 has identical top and bottom followers 166, 166 of generally rectangular box shape, open at the inner face and with side walls flaring somewhat to form a widened central portion as at 168 (Figure 17) to accommodate expansion of the enclosed block or column of resilient material 170, said side walls being of reduced height along said central portions as shown at 169, 169 (Figure 18). Each follower 166 is afforded diagonal end walls 172, 172 with inner friction faces 174 of the configuration best shown in Figure 19 and each of said end walls 172 is afforded at the extremity thereof a central inwardly projecting lug 176, said lug being received in the slot 178 formed in the adjacent end of the side wedge 180 and having abutment as at 182 with the shoulder 184 defining the extremity of said slot. The engagement of the lugs 176 in the slots 178 afford means of keying together the followers and side wedges, the lugs 176 being slidable in said slots as the device is compressed. Each follower is cored out as at 186, 186 to permit the escape of any extraneous matter such as water that might accumulate in the device and the edges of the openings 186 are smoothly rounded as at 188, 188 to prevent possible abrasion of the resilient column member 170 as it is distorted under compression. Positioning means between the resilient column member 170 and the top and bottom followers is afforded as at 190, 190 and other positioning means between said resilient column member and the side wedges 180, 180 are afforded at 192, 192.

The side wedge is shown in detail in Figures 20 to 23 inclusive. The said side wedge comprises a solid block of rigid material, such as hard cast iron, affording satisfactory frictional engagement with the end followers 166, 166 when said followers are formed of alloy steel. Each side wedge is cored out on its inner face as at 194 to accommodate a lug on the resilient column member 170 and position said column member with respect to said side wedge. The inner face of each side wedge is smoothly tapered as at 196, 196 away from the opening 194, said tapering affording clearance for the expansion of the resilient column 170 as the device is compressed. The ends of the side wedge are of smooth arcuate form as indicated at 198, 198 to prevent abrasion of the resilient column. The outwardly directed faces of the side wedges are formed with diagonally arranged friction surfaces 200, 200 complementary in form to the inner friction surfaces 174, 174 on the inner faces of the end walls of the followers.

The detail of the resilient column member 170 is shown in Figures 24, 25 and 26. It is a generally rectangular body of solid rubber composition having its greater width centrally thereof and tapering sharply therefrom along each edge to the opposite ends as indicated at 202, 202, the end portions being also tapered like sharply from opposite sides of the device to afford reduced thickness thereof as seen at 204, 204. The central portion may be of constant thickness for approximately half the length of the column, said diminishing thickness beginning as indicated at 206, 206. If desired, the thickness may taper from the center toward the sides as shown by phantom lines as at 205 in Figure 26. The lateral edges of the column are afforded positioning means in the form of lugs 208, 208 for cooperation with the adjacent side wedges as already indicated at 192 (Figure 16). The opposite ends of the rubber column are also hollowed out as at 210, 210 to afford positioning means with respect to the followers. All of the edges and corners of this resilient column are afforded radii as indicated at 212 to prevent abrasion or splitting thereof as the member is compressed and released in operation.

In each of these cushioning devices the friction absorbing element or snubber is so positioned that the friction faces are positioned a maximum distance from the center of turning when one spring plate is rotated with respect to the other, thus providing a maximum moment arm to restore said plates to their normal position, one above the other. Likewise these friction surfaces are widely spaced from the center of distortion which takes place when the plates are moved laterally or longitudinally with respect to one another and the actions of the snubber under the various forms of distortion thereof are more or less diagrammatically illustrated in Figures 27 to 31 inclusive.

In Figure 27 it may be noted that the top spring plate 214 and the bottom spring plate 216 have moved laterally relative to one another as indicated by the arrows 218, 218, said lateral movement being the result of relative lateral motion between the supporting side frame member 220 with respect to the bolster or load carrying member 221 which is supported as at 222 on the top spring plate 214. Figure 27 illustrates a truck of spring plank type with the side frame 220 afforded a widened spring seat portion 224 upon which may be seated the spring plank 226 and on said spring plank is superposed the bottom spring plate 216 of my novel cushioning mechanism. The side frame 220, the spring plank 226 and the plate 216 are so secured to each other as to prevent their relative movement with respect to each other. As illustrated herein, the cushioning mechanism comprises the friction absorbing device generally designated 228 with the top follower 230 secured to the top plate 214 and the bottom follower 232 secured to the bottom plate 216 with the intermediate portions of the friction absorbing device including side wedges and the compressed rubber pad assuming a diagonal position as diagrammatically indicated at 234. Under such lateral motion the condition of the friction engaging surfaces between the side wedges 236, 236 and the friction surfaces of each follower is diagrammatically shown in Figure 30. It may be seen that the rubber block 238 is compressed and that the side wedges bear against diagonal surfaces on the follower as at 240, 240 while clearances are developed at 242, 242, the rubber block tending to return the parts to their normal relationship as illustrated in Figure 29 wherein the diagonal frictional engaging surfaces between the side wedges 236, 236 and the follower 232 having normal bearing as at 244, 244.

Action of my novel cushioning device under torsional movement is diagrammatically illustrated in Figure 28 wherein it may be noted that the top plate 214, shown in broken lines, is rotated an appreciable amount in relation to the bottom plate 216, shown in full lines, said relative rotation being illustrated by the arrows 246, 246. Also, the top and bottom followers 230, 232 of the friction device are correspondingly rotated and the relative position of the parts of the friction absorbing device under such conditions of torsional movement are diagrammatically shown in Figure 31 wherein it will be seen that the side wedges 236, 236 bear against the follower 232 at diagonally opposite corners of the friction surfaces thereof as at 248, 248 and diagonally opposite clearances as at 250, 250 are developed while the resilient member 238 is further compressed, thus storing up energy to return the parts to their normal relationship.

It is thus apparent that my novel device resists relative lateral and torsional movement of the followers because the side wedges are held against complementary diagonal surfaces on the followers by the precompressed resilient member and such relative movement displaces the side wedges from their V-shaped seat causing further compression of the resilient member.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A cushioning unit affording a means of connection between supporting and supported members of a railway car truck and comprising retaining plates, coil springs and a friction device confined between said plates with top and bottom followers integrally formed with said plates, friction surfaces on said followers adjacent opposite ends thereof near the edges of said plates, friction shoes in engagement with said surfaces, a composite resilient member compressed between said followers and shoes, said followers being capable of relative lateral or torsional movement with respect to each other wherein frictional resistance to such movement is developed between said shoes and followers, whereby said device functions to restore said plates to their normal relative positions, said resilient member comprising spaced resilient columns and an intervening rigid element.

2. A cushioning unit affording a means of connection between supporting and supported members of a railway car truck comprising retaining plates, coil springs and a friction device confined therebetween with followers secured respectively to said plates, each of said followers having friction surfaces at its opposite ends adjacent the edges of said plates, friction shoes in engagement therewith, a composite resilient member in compression between said shoes and followers, said top and bottom plates and followers being capable of relative torsional and lateral motion with respect to each other, said device being further characterized by the development of frictional resistance to such movement by the engagement of said shoes with said friction surfaces, said resilient member comprising spaced resilient columns and an intervening rigid element.

3. A cushioning unit affording a means of connection between supporting and supported members of a railway car truck comprising retaining plates, coil springs and a friction device confined between said plates with top and bottom followers integrally formed with said plates, friction surfaces on said followers near the edges of said plates, friction shoes in engagement with said surfaces, a composite resilient member compressed between said followers and shoes, said followers being capable of relative torsional movement wherein frictional resistance to such movement is developed between said shoes and followers and said resilient member is further compressed, thereby storing up energy to restore said plates to their normal relative positions, said resilient member including resilient columns spaced by a rigid element and compressed between said shoes and followers.

4. A cushioning unit affording means of connection between a supporting and a supported member of a railway car truck comprising top and bottom retaining plates, a plurality of coil springs and a friction device confined between said plates with followers integrally formed with said plates respectively, said device comprising diagonal friction surfaces on said followers adjacent the edges of said plates, friction shoes in engagement therewith, and resilient means under compression between said shoes and said followers, said device being characterized by offering resistance to relative torsional and lateral movements between said followers and functioning as a means of restoring said followers to normal position after such movement, said resilient means including a rigid element spacing rubber columns compressed between said shoes and followers.

5. A cushioning unit affording means of connection between a supporting and a supported member of a railway car truck comprising top and bottom retaining plates, a plurality of coil springs and a friction device confined between said plates with followers integrally formed with said plates respectively, said device being characterized by diagonal friction surfaces at the ends of said followers adjacent the edges of said plates, friction shoes in engagement with the friction surfaces at opposite ends of the device, a plurality of resilient columns compressed between said followers in engagement with the shoes at opposite ends of the device respectively, and a rigid member interposed between said columns.

6. In a suspension unit for connection between supporting and supported members of a railway car truck, a top retaining plate secured against relative lateral or torsional movement with respect to said supported member, a bottom retaining plate secured against relative lateral or torsional movement with respect to said supporting member, coil springs and a friction device confined between said plates with followers integrally formed with said plates respectively, said device being characterized by frictional resistance offered to relative torsional or lateral movement between the followers thereof, whereby said device functions to restrain relative lateral and torsional movements between said members, said friction device comprising spaced resilient columns compressed between said followers and associated friction shoes.

7. A cushioning unit affording a means of connection between supporting and supported members of a railway car truck comprising top and bottom retaining plates, a plurality of coil springs and a friction device confined between said plates with followers integrally formed with said plates respectively, friction surfaces on said followers at opposite ends thereof adjacent the edges of said plates, friction shoes in engagement therewith, and a resilient member compressed between said shoes and followers, said unit being characterized by resistance offered to relative torsional and lateral movements between said plates developed by frictional resistance between said shoes and followers, said resilient member having resilient columns spaced by a rigid member and compressed between said shoes and followers.

8. A friction absorbing device comprising cup-shaped top and bottom followers of relatively great length as compared with the width thereof, end and intermediate diagonal friction surfaces formed on each follower, a plurality of friction shoes in engagement with the friction surfaces at each end of the device, and a resilient column under compression between the shoes and followers at each end of the device, said device being characterized by resistance offered to relative torsional and lateral movements between said followers developed by friction between said shoes and surfaces and functioning as a means of restoring said followers to their normal position after such movement.

9. In a suspension system for a railway car truck, top and bottom retaining plates, a plurality of coil springs and a friction device confined therebetween with respective followers integrally formed with said plates, said device comprising friction shoes in engagement with said followers at opposite ends thereof, and a composite resilient member compressed between said shoes and followers, said device having lateral and torsional rigidity and being characterized by frictional resistance offered to relative lateral or torsional movement between said plates, whereby said device functions to restore said plates to their normal relative position after such movement, said composite member comprising rigid means spacing resilient elements.

10. A cushioning unit affording means of connection between a supporting and a supported member of a railway car truck comprising top and bottom retaining plates, a plurality of coil springs and a friction device confined between said plates with followers integrally formed with said plates respectively, said device comprising friction surfaces at the ends of said followers adjacent the edges of said plates, intermediate friction surfaces on said followers, friction shoes engaging the end and intermediate friction surfaces at each end of the device, and a resilient column under compression between the followers and shoes at each end of the device, said device being characterized by offering frictional resistance developed between all of said shoes and followers to relative torsional and lateral movements between said followers and functioning to restore said followers to their normal positions.

11. A cushioning unit affording means of connection between a supporting and a supported member of a railway car truck comprising top and bottom retaining plates, a plurality of coil springs and a friction device confined between said plates with followers integrally formed with said plates respectively, said device comprising friction surfaces at the ends of said followers adjacent the edges of said plates, intermediate friction surfaces on said followers, friction shoes in engagement with the friction surfaces at each end of said device, and a resilient member under compression between the shoes and followers at each end of the device.

12. A cushioning unit affording a means of connection between supporting and supported members of a railway car truck and comprising spaced retaining plates, coil springs and a friction absorbing device confined between said plates with top and bottom followers formed respectively with said plates, friction surfaces on the followers adjacent opposite edges of said plates, friction shoes engaging said surfaces, and resilient means compressed between said shoes and followers and further compressible as said followers are moved torsionally or laterally with respect to each other to store up energy available to return the parts of said device to their normal relative positions.

13. A cushioning unit affording means of connection between a supporting and a supported member of a railway car truck comprising top and bottom retaining plates, a plurality of coil springs, and a friction device confined between said plates with followers integrally formed with said plates respectively, said device comprising friction surfaces at opposite ends thereof adjacent the edges of said plates, friction shoes in engagement with said surfaces, composite resilient means compressed between said shoes and followers, said resilient means comprising resilient elements compressed between said followers, and a rigid member spacing said resilient elements.

14. A friction absorbing device comprising cup-shaped top and bottom followers of relatively great length as compared with the width thereof, end and intermediate diagonal friction surfaces formed on each follower, a plurality of friction shoes in engagement with the friction surfaces at each end of the device, and a resilient column under compression between the shoes and followers at each end of the device, said device being characterized by resistance offered to relative torsional and lateral movements between said followers developed by friction between said shoes and surfaces.

15. In a suspension system for a railway car truck, top and bottom retaining plates, a plurality of coil springs and a friction device confined therebetween with respective followers immovably fixed to said plates, said device comprising friction shoes in engagement with said followers at opposite ends thereof, and resilient means compressed between said shoes and followers, said device having lateral and torsional rigidity and being characterized by frictional resistance offered to relative lateral or torsional movement between said plates, said resilient means comprising spaced rubber columns compressed between said shoes and followers and spaced by rigid means.

16. A suspension unit for a railway car truck comprising spaced retaining plates, a plurality of coil springs and a friction device confined therebetween with followers fixedly secured respectively to said plates, shoes engaging said followers, said device being characterized by frictional resistance offered to relative lateral or rotational movement of its respective followers, whereby said device resists relative lateral and rotational movement of said plates and is operable to restore said plates to their normal relative position after such movement, said device comprising resilient means compressed by all of said shoes and followers.

17. A suspension unit for a railway car truck comprising spaced retaining plates, a plurality of coil springs and a friction device confined therebetween with followers secured respectively to said plates, said device being characterized by offering frictional resistance to relative lateral or rotational movement of its respective followers, whereby relative lateral or rotational movement of said plates is resisted, said device comprising friction shoes engaging opposite ends of said followers, and resilient means under compression between all of said shoes and followers.

18. A suspension unit for a railway car truck comprising coil springs and a friction device, confining plates therefor, said friction device being characterized by lateral and torsional stability and having opposite followers secured to said plates, whereby relative lateral or torsional displacement of said plates is resisted by said device, said device comprising friction shoes engaging the followers at each end of the device, and resilient means compressed by said shoes and followers.

19. A suspension group for a railway car truck comprising coil springs and a friction device, top and bottom spring plates, said device having followers fixedly secured to said plates and comprising V-shaped friction surfaces aligned with the edges of said plates, friction shoes in engagement therewith, and resilient means compressed by said shoes and followers.

20. A suspension group for a railway car truck comprising coil springs and a friction device, top and bottom spring plates, said device having followers fixedly secured to said plates and comprising V-shaped friction surfaces aligned with the edges of said plates, friction shoes in engagement therewith, and resilient means in abutment with said shoes and followers and compressed thereby, and further compressible as said group is depressed.

21. A suspension group for a railway car truck comprising coil springs and a friction device, top and bottom spring plates, said device having followers fixedly secured to said plates and comprising V-shaped friction surfaces aligned with the edges of said plates, friction shoes in engagement therewith, and resilient means in abutment with said shoes and followers and compressed thereby, said resilient means comprising rigid means spacing a plurality of resilient members.

22. A suspension group for a railway car truck comprising coil springs and a friction device, top and bottom spring plates, said device having followers fixedly secured to said plates and comprising V-shaped friction surfaces aligned with the edges of said plates, friction shoes in engagement therewith, and resilient means in abutment with said shoes and followers and compressed thereby, said resilient means comprising a plurality of spaced rubber columns and intervening rigid means.

23. A suspension group for a railway car truck comprising coil springs and a friction device, top and bottom spring plates, said device having followers fixedly secured to said plates and comprising V-shaped friction surfaces aligned with the edges of said plates, friction shoes in engagement therewith, and resilient means in abutment with said shoes and followers and compressed thereby, said resilient means comprising spaced rubber columns compressed by said followers, and an intervening rigid member.

24. A suspension group for a railway car truck comprising coiled springs, top and bottom spring plates, and a friction device, said device having followers secured to said plates and comprising friction surfaces aligned with the edges of said plates, friction shoes in engagement therewith, spaced resilient columns abutting respective shoes, and a rigid member extending between and connected to said columns, said columns being compressed by and between said followers, said member, and respective shoes.

25. A friction device comprising top and bottom followers having friction surfaces at the ends thereof, friction shoes in engagement therewith, a rigid member intermediate said shoes, and resilient means extending between and supporting said member and respective shoes, said means engaging and being compressed by said followers, said member, and respective shoes.

26. A suspension group for a railway car truck comprising coiled springs, top and bottom spring plates, and a friction device, said device having followers secured to said plates and comprising friction surfaces adjacent the edges thereof, friction shoes in engagement with said surfaces, and resilient means comprising spaced resilient members and an interposed rigid member, said spaced members being compressed by and between said followers, said rigid member, and respective shoes.

27. A suspension group for a railway car truck comprising coiled springs, top and bottom spring plates, and a friction device, said device comprising followers fixed to said plates and having friction surfaces adjacent the ends thereof and intermediate friction surfaces, friction shoes in engagement with respective surfaces, and resilient means engaging and compressed between the followers and shoes at each end of the device.

28. A friction absorbing device comprising top and bottom followers, each comprising end and intermediate friction surfaces, two pairs of friction shoes in engagement with respective surfaces, and a resilient member compressed between each pair of shoes and the followers.

29. A suspension group for a railway car truck comprising a plurality of coiled springs, top and bottom spring plates, and a friction device, said device comprising top and bottom followers secured to said plates and having oppositely spaced friction surfaces, friction shoes in engagement with respective surfaces, and resilient means engaging and compressed between said followers and said shoes.

30. In an energy absorbing device, sets of interlocked friction elements having spaced diagonal face engagement and intermediate oppositely directed diagonal face engagement, and resilient means under compression between said elements.

31. In a friction absorbing device, a plurality of followers each presenting spaced friction surfaces and an intermediate friction face, friction shoes in engagement with respective surfaces and respective faces, each shoe comprising interlocking means cooperating with means on both followers, and resilient means compressed between said shoes.

32. In a friction absorbing device, a plurality of followers each presenting spaced friction surfaces and an intermediate friction face, friction shoes in engagement with respective surfaces and respective faces, and resilient means in abutment with said shoes.

ROBERT B. COTTRELL.